United States Patent Office 3,057,702
Patented Oct. 9, 1962

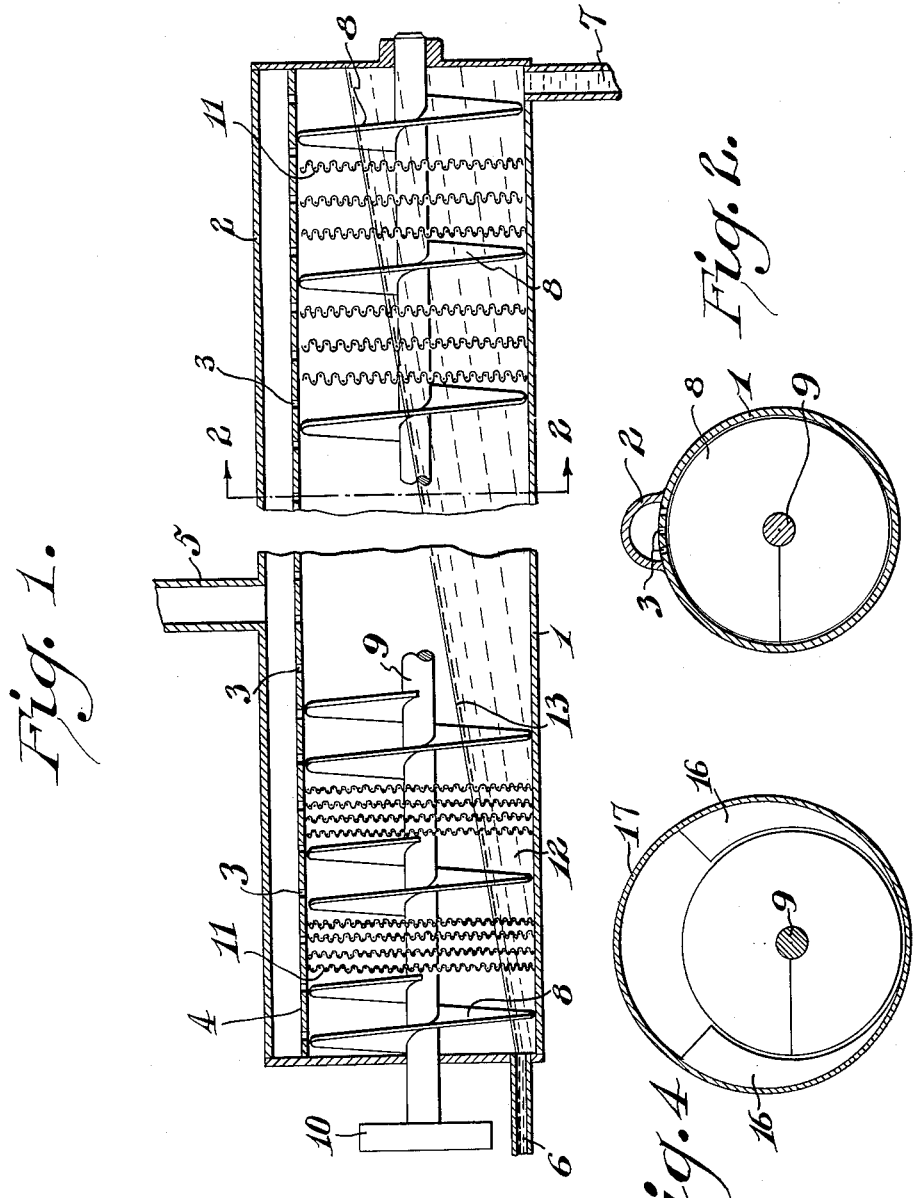
INVENTORS
NORWIN CALEY PIERCE
DAVID FRANK RYDER
BY C. H. Mortenson
ATTORNEY

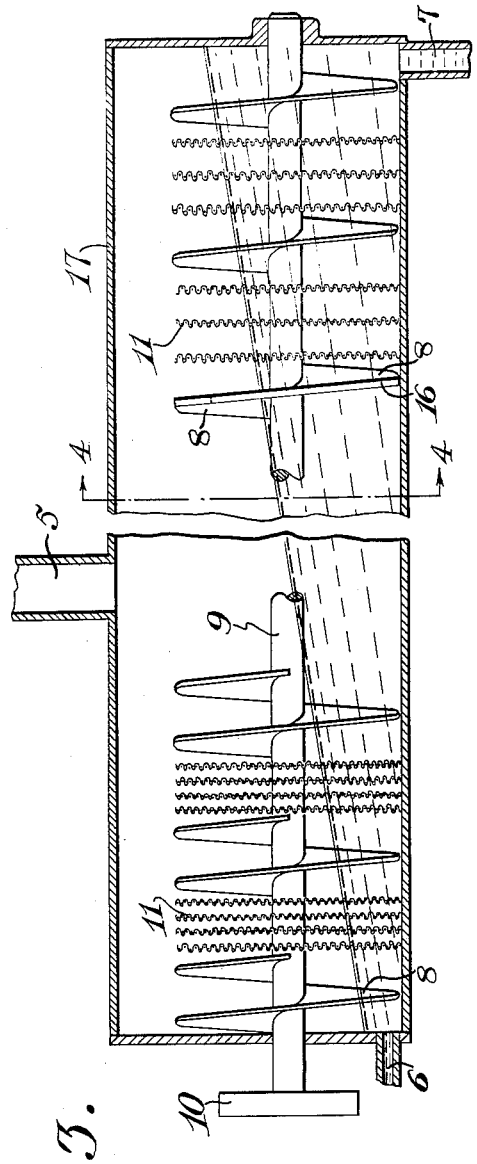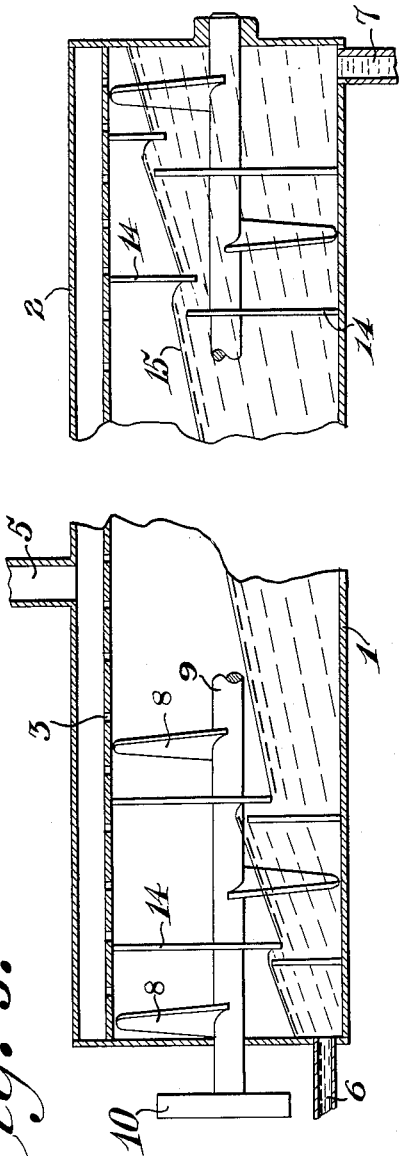

3,057,702
APPARATUS FOR PREPARATION OF CONDENSATION POLYMERS
Norwin Caley Pierce, New Castle, and David Frank Ryder, Wilmington, Del., assignors to E. I. du Pont de Nemours and Company, Wilmington, Del., a corporation of Delaware
Filed May 11, 1953, Ser. No. 354,312
5 Claims. (Cl. 23—285)

This invention relates to apparatus and a process for the preparation of condensation polymers, particularly polyesters. More particularly this invention is concerned with a process and equipment utilized in the continuous preparation of polymers from terephthalic acid.

In the production of fiber or film-forming polyethylene terephthalate from bis-beta-hydroxyethyl terephthalate or its polymers having a low degree of polymerization (DP), such as the dimer, trimer or tetramer or mixtures thereof, the polymerization is carried out in the presence of a catalyst such as lead oxide at an elevated temperature between about 230° C. to 290° C. and preferably between 260° C. to about 275° C. and at reduced pressure in the vicinity of 0.05 to 100 millimeters of mercury, with the final stages of polymerization being effected in the pressure range of 0.05 to 20 millimeters of mercury for optimum results. At these reduced pressures the free ethylene glycol which emerges from the polymer as a result of the condensation reaction is removed. The reaction mixture increases in viscosity as the reaction progresses, starting as a thin syrupy liquid and ending up as a viscous melt with a viscosity in the range of 1,000 to 15,000 poises.

In the carrying out of such a polymerization in either a batch or a continuous manner, it is essential to control the pressure-temperature relationships in the initial stages to prevent undue loss of the low molecular weight polymeric material through volatilization. Customarily, treating the monomeric material or the low DP polymeric material in the early stages of the polymerization process at the lower temperatures and at the higher pressures disclosed presents no serious problem. The ethylene glycol is easily removed and the viscosity of the polymerizing mass is sufficiently low to permit handling in the normal manner for liquids. However, as the DP and the viscosity increase, it becomes more difficult to remove efficiently and quickly the ethylene glycol from the interior portions of the reacting mass. Although in batch operation this difficulty has been substantially overcome by subjecting the viscous mass to vigorous and thorough agitation, such a procedure is not permissible in a continuous reactor because of the necessity for maintaining a reaction gradient along the line of flow.

An object of this invention is the provision of a process for flowing a reaction mass in a continuous manner while condensation polymerization reactions are being effected and/or while removing volatile material from the mass. Another object is the provision of apparatus in which the desired viscosity increases and the desired volatilizations are attainable. Other objects will appear hereinafter.

In the drawings:
FIGURE 1 is a longitudinal, cross-sectional view of one form of the apparatus;
FIGURE 2 is taken on line 2—2 of FIGURE 1;
FIGURE 3 is a longitudinal, cross-sectional view of another form of the apparatus;
FIGURE 4 is taken on line 4—4 of FIGURE 3; and
FIGURE 5 is a longitudinal, cross-sectional view of a modification involving the use of baffles.

The desired results may be achieved effectively and efficiently by flowing the reacting mass, usually polymeric, through a substantially horizontal vapor-heated substantially cylindrical vessel containing a discontinuous screw having a diameter substantially the same as the inside diameter of the vessel and having means interspersed between the separated screw flights for breaking the large mass into smaller masses and means for maintaining the vessel along its entire length under reduced pressure. More particularly the means for forming the smaller masses, such as thin sheets or films of the viscous liquid, may be screens, sheets, or spokes or the like mounted perpendicular to the axis of the screw shaft.

In general, it is desired to bring about the efficient and rapid removal of a volatile constituent from a mass, such as a reacting mass, which increases markedly in viscosity as the reaction progresses. In accomplishing this and in producing a product of high uniformity, in a continuous process the apparatus used involves means for maintaining suitable conditions to promote the reaction by vapor removal (usually elevated temperature and diminished pressure), a means for generating an adequate surface area of the reacting mass, means for preventing the advancing flow of the reacting mass from by-passing the desired course through the vessel and means for uniformly advancing the reacting mass from the inlet to the outlet.

The apparatus and process of this invention may be used with any liquid or melt, monomeric or polymeric where it is desired to separate volatile material from non-volatile material. The drying action or separation desired can be effected whether chemical reactions are occurring or not, and viscosity increases can come about through concentration of the mass. Rapid volatilization is effected by this invention, and holdup of material is advantageously slight.

Exemplifications of the invention are shown in the drawing. In FIGURE 1 a preferred embodiment of the described apparatus is shown. The cylindrical shell 1 has affixed to its upper portions the dome 2 which is interconnected with the interior of the shell through perforations 3 covering the common surface 4. Pipe 5 is connected to an evacuation system (not shown) for maintaining the desired reduced pressure within the shell. The mass 12, which may be a reaction mass composed of monomers or low polymers, enters through pipe 6 and is forwarded through the cylinder toward the discharge at 7 by the discontinuous screw flight segments 8 which are spaced at intervals on shaft 9 throughout the entire length of the shell. Shaft 9 may be rotated by any convenient means, such as by motor 10. In FIGURE 1 these screw flight segments are shown to extend over 540° of arc at the entrance end and over 360° of arc at the exit end. It is generally preferred that the screw flights at the entering end cover a greater arc than the screw flights at the exit end because of the lower viscosity at the entrance. It is quite possible to use screw flight segments having both greater and lesser extents of arc than those shown. The minimum arc for screw flight segments is 180° and this is a workable condition only when the leading edges of alternate screw flight segments are spaced 180° apart, thus insuring compartmentation between every third screw segment. When the screw segments are placed randomly on shaft 9 with respect to the angular position of the leading edge, it is preferable that each screw segment be at least 360° in extent to insure compartmentation.

Between alternate screw segments are placed film-forming means. The preferred means for forming such films are screens 11 placed perpendicular to the axis of the screw shaft. These screens are preferably mounted on shaft 9 and rotate with the shaft. The porosity of these screens and the spacing between them increases from the entrance end to the exit end. The screens at the entrance end may vary from 50 mesh to 2 mesh, and when handling polyethylene terephthalate having an entering relative viscosity of 3.5, these screens will preferably be about 4 mesh. At the exit end, the screens will usually vary between 8 mesh and ½ mesh, and when delivering polyethylene terephthalate with a relative viscosity of 32, they will preferably be about 2 mesh. For mechanical reasons it is usually not desirable to place the screens at the entrance end closer together than 1 inch, although the apparatus will work at spacings as little as ½ inch. At the exit end the screens will be spaced from 2 to 8 inches apart, depending upon the viscosity of the polymer produced, the speed of rotation and the diameter of the vessel. For polyethylene terephthalate having a relative viscosity of approximately 32 with 48 inch diameter screens rotating at one r.p.m., the screens should be placed about 4 inches apart. To space them closer together reduces the efficiency of the apparatus because of the tendency of the viscous mass to fill the entire space between the respective screens. To space them farther apart is uneconomical in that a longer length reactor is required.

Alternative means for forming films of the reacting material, to expose a large surface area to the conditions maintained in the reaction vessel, comprise perforated sheets, expanded metal gratings, spokes or other radial projections, discs or the like and combinations thereof generally mounted on the shaft for rotation.

In operation the mass which is at a temperature above its melting point, enters the cylinder, and immediately under the influence of the heat and reduced pressure volatile material begins to be removed. The vapors pass through the orifices 3 and out channel 5 to a condenser or a collection means (not shown). The mass is fed to and from the cylinder at rates designed to maintain a level in the cylinder approximately that shown by line 13 in the modification depicted in FIGURE 1. In other words, the volume of the mass in the cylinder increases from the entrance toward the exit. Generally, at no place is the cylinder completely filled, although it may be so after substantially complete volatilization is attained. Thus, all of the screw flights and screens or other film-forming means are usually constantly dipping into the mass and carrying some of the fluid mass up into the free space in the form of thin sheets or films. Removal of bubbles from these films occurs readily. Also, part of the mass that is picked up by the screw flights falls from or runs back down the flights as it does similarly on the screens so that the surface generation is greatly increased. Volatilization again is effected from the resultant thin masses. As stated before, maximum surface generation may be obtained by employing screen spacings that are neither too close nor too wide. However, by employing scraper fingers mounted on the shell between the screens, the screens may be moved closer together without eliminating the free space between them. By paying heed to such considerations, it is possible to use increased screw speed. Another way of increasing the surface generation within a single vessel of a given length is to widen it out to permit the use of two rotating shafts bearing screw flights intermeshing within the shell.

Generally, no difficulty is encountered with by-passing. The discontinuous screw surprisingly prevents this. However, if it is desired to decrease the arc of the screw flights beyond that set forth above as a minimum, baffles 14, shown in FIGURE 5 may be appropriately placed between sections of the rotating member. The level of the mass will be similar to that shown by line 15 in FIGURE 5. When such baffles are employed, it is possible to dispense with the screw sections 8 entirely and to employ gravity or a static head to cause the material to flow from the inlet to the outlet. Such a system is best operated by inclining the finisher at an angle from the horizontal. When baffles are used in the modification given in FIGURE 5, it may be desirable to dispense with dome 2 and to lead separate evacuating lines into each of the baffled compartments. If desired, these compartments operate at continuously diminishing pressures from the inlet to the outlet end.

Generally, very little, if any, of the mass passes through the orifices 3, even though the screw flights and the screens approximate the diameter of the cylindrical shell. This situation obtains from the fact that the orifices are relatively large and are situated at the top of the cylinder where, of course, the film of the mass on the screw flights or screens or other surface-generating means is at a minimum and is reasonably tightly held by these means. In fact, where it is desired to operate such a device at reduced capacity, it is possible to have enough free space between the cylindrical shell and the screw flights and the screen or other surface generating means that the evacuating duct may be tied in directly to the cylinder without the use of an auxiliary dome. Where strength considerations permit, another modification uses the dome as depicted in FIGURE 2 but instead of employing orifices through the shell wall into the dome, the whole common surface between the dome and the shell is cut away, thus preventing all difficulties which might ensue from the plugging of these orifices. Still another modification, as shown in FIGURE 3, omits the dome by employing a forwarding and film-forming means having a diameter somewhat smaller than and being set off-center with the shell. Such a construction provides in the upper part of the shell a free space which permits the easy removal of the gaseous by-product. If desired, the walls of the shell may be continuously scraped by a cage-like device rotated by means of a planetary gear arrangement. Furthermore, with some designs it may be necessary to overcome by-passing tendencies and, hence, fins 16, shown in FIGURE 4, can be welded to the interior walls of the shell at various points along its length as may be necessary or the shell may have an elliptical shape to conform more closely to the contour of the lower half of the forwarding and film-forming means. The shell 17 of the modification in FIGURE 3 is either round or elliptical and, for purposes, of illustration, one fin 16 is shown in FIGURE 3.

The rotational speed of the shaft actuated by driving means 10 may vary from $\frac{1}{10}$ up to 20 revolutions per minute, depending upon the rate of throughput desired. Low speeds are preferred because of more than proportionally reduced power input. The rate of throughput, of course, will depend on the end product desired and the effective rate of reaction by which the feed stock is converted to this end product. The effective rate of reaction will in turn depend on the temperature-pressure relationships in the vessel and the ratio of the total surface area of the reacting mass to its total weight within the confines of the vessel. In the absence of baffles, the reactor should contain at least 3 screw flight segments and preferably more. Usually from 5 to 15 such segments are required. The pitch of these screw flight segments may be as low as ½ inch and may vary up to 4 or 5 inches or even more, but preferably will be in the range of 1 to 3 inches.

The internal diameter of the steel shell may vary between rather wide limits with 4 inches considered the minimum workable condition, with 15 to 80 inches considered the highly practical range and with a maximum limit dependent only upon the structural considerations of the material employed for construction. The ratio of the length to the diameter will preferably be within the range of 2 to 10 and will be dependent upon the throughput desired, the viscosity of the feed, the viscosity of the product and the rate of reaction.

When the described apparatus is used for the production of fiber-forming polyethylene terephthalate and when operating within the preferred temperature and pressure range previously disclosed, the feed stock to the reactor should have a relative viscosity of not less than 3.5 (DP of approximately 15). Usually the relative viscosity of this feed stock will not exceed 8, although it is quite practical to handle feed stocks of higher relative viscosity by simply changing the dimensions of the spherical shell, the pitch and angular extent of the screw segments, the porosity and spacing of the screens and the rotational speed of the screw shaft.

It is further to be realized that such a reactor may be employed for the production of other materials which in the process of their production go from rather fluid liquids at the start to rather viscous masses at the end and which give off volatile materials during this process. Such classes of compounds would include polyamides, polyanhydrides, polyacetals, polyesters, polyethers, polysulfides, and similar materials. When employing this invention, which is suitable for converting a feed stock of polyethylene terephthalate having a relative viscosity of 3.5 to a finished polymer having a relative viscosity of 32, for finishing polycaproamide polymer derived from e-caprolactam, it was found that such a device efficiently handled a feed stock having a relatively viscosity of 10 and delivered the finished polyamide with a relative viscosity of 45 when the vessel was maintained under a pressure of 5 mm. of mercury.

The shell of the reactor together with the dome for vapor removal, the entrance pipe and exit pipe are heated and usually all are jacketed for vapor heating. The usual means for obtaining the temperature in the desired range are para-cymene or "Dowtherm A" (a mixture of diphenyl and diphenyl oxide), although any heating means may be used.

Any modification which conforms to the principles of the invention described herein is intended to be included within the scope of the claims below.

We claim:
1. Apparatus comprising a vessel with a generally cylindrical interior having its long axis substantially horizontal and provided with heating means, an inlet and outlet for viscous material at opposite ends of the vessel and an outlet at the top of the vessel for removing volatile material, a rotatable shaft substantially concentric with the cylindrical axis and carrying affixed thereto in a plurality of discontinuous flights a screw of radius approaching the cylinder radius, and at least one circular foraminous member of radius closely approaching the cylinder radius affixed concentrically to the shaft between adjacent screw flights.

2. The apparatus of claim 1 in which the foraminous member is a screen.

3. The apparatus of claim 1 in which the minimum angle of arc of each screw flight is at least ½ circle and each pair of adjacent screw flights completes at least 1 whole circle.

4. The apparatus of claim 1 in which the flight arc at the inlet end is greater than the flight arc at the outlet end.

5. The apparatus of claim 1 in which the minimum angle of arc in each screw flight is at least 1 whole circle and at least 2 foraminous members intervene between adjacent screw flights, the foraminous members being screens which are of finer mesh and positioned closer together near the inlet end than near the outlet end of the vessel.

References Cited in the file of this patent

UNITED STATES PATENTS

| | | |
|---|---|---|
| 17,448 | Partz | June 2, 1857 |
| 956,065 | Fleming | Apr. 26, 1910 |
| 979,362 | Wiegand | Dec. 20, 1910 |
| 1,273,208 | Weil | July 23, 1918 |
| 2,071,250 | Carothers | Feb. 16, 1937 |
| 2,637,666 | Langen | May 5, 1953 |
| 2,641,592 | Hofrichter | June 5, 1953 |
| 2,703,310 | Kretchmar | Mar. 1, 1955 |

FOREIGN PATENTS

| | | |
|---|---|---|
| 871,387 | France | Jan. 15, 1942 |
| 980,573 | France | Dec. 27, 1950 |
| 237,400 | Switzerland | Sept. 1, 1945 |

OTHER REFERENCES

Hardy, J. Society Chemical Industries, 67, November 1948, pages 426–32.

Serial No. 309,376, Friederich et al. (A.P.C.), published April 20, 1943.